Sept. 27, 1927.  
L. R. HUPP  
1,643,378  
DRILL SET  
Original Filed Jan. 22, 1926
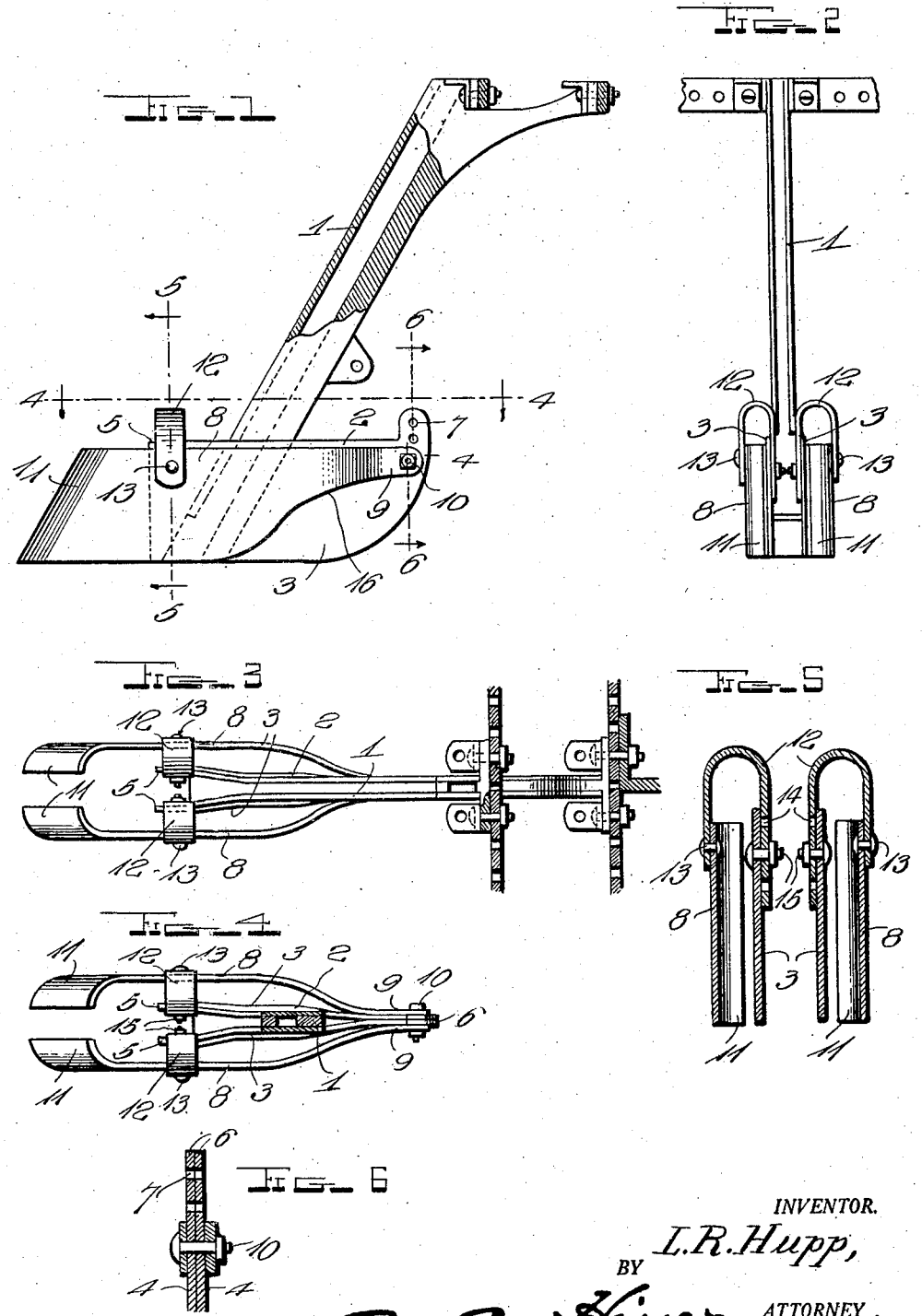
INVENTOR.  
*L.R.Hupp,*  
BY  
ATTORNEY.

Patented Sept. 27, 1927.

1,643,378

UNITED STATES PATENT OFFICE.

LONZO R. HUPP, OF URBANA, OHIO.

DRILL SET.

Original application filed January 22, 1926, Serial No. 83,052. Divided and this application filed October 11, 1926. Serial No. 140,905.

This invention relates to drill sets, and the present application is a division of my prior application for planters, filed January 22, 1926, Serial No. 83,052.

One object of the invention is to provide a novel and improved construction of seed chute, shoe and coverers operatively combined and arranged so as to ensure a certain deposit of the seed in the furrow and the covering of the seed in a reliable and uniform manner.

Another object of the invention is to provide a construction of the shoe and adjustable mounting of the coverers whereby the depth of the soil filled into the furrow to cover the seed may be regulated and governed as desired to suit requirements.

The invention consists of the features of construction, combination and arrangement of parts, hereinafter fully described and claimed, reference being had to the accompanying drawing, in which:—

Figure 1 is a side elevation of a seed chute, partly in section, shoe and coverers embodying my invention.

Figure 2 is a rear elevation of the same.

Figure 3 is a top plan view of the parts illustrated in Figures 1 and 2.

Figure 4 is a sectional plan view on line 4—4 of Figure 1.

Figure 5 is a vertical transverse section on line 5—5 of Figure 1.

Figure 6 is a similar section on line 6—6 of Figure 1.

In carrying my invention into practice, I provide a hollow shank 1 forming a seed chute, which shank is suitably secured, in practice, to the frame of the machine and operatively arranged to receive seed dropped by a suitable seed dropping mechanism.

The shank or shoe 1 carries at its lower end a seed depositing shoe or runner 2 formed of blades or plates 3 arranged on opposite sides of the shank, and between which the lower end of the shank enters. These blades or plates 3 have forwardly converging and lapping front ends 4 and diverging rear ends 5, said lapping front ends 4 being suitably joined and formed to provide an upturned hanger arm 6 provided with a plurality of openings 7. The blades or plates of the shoe are rigid with the shank 1, the forward ends of said blades or plates extending in advance of the shank and the rear ends of said blades or plates projecting beyond the rear of the shank. The seed passing downwardly through the shank or chute is deposited in the ground between the diverging rear ends 5 of the blades or plates 3, which ensure their positive deposit in the previously formed furrow and guard against the scattering or displacement of the seed by gusts of air.

For the purpose of covering the seed and closing the furrow, a covering device composed of blades or plates 8 is provided for cooperation with the shoe 2. These blades are disposed on opposite sides of the shoe and also project in advance of and behind the lower end of the shank. As shown the blades 8 are formed at their forward ends with attaching arms 9 disposed in converging relationship and perforated for the passage of a bolt 10 adapted to be passed through any one of the openings 7 in the hanger arm 6, whereby the forward end of the covering device is adjustably and pivotally connected with the forward end of the shoe, the bolt 10 providing a pivotal support on which the covering blades may be tilted upwardly or downwardly. The rear ends of the covering blades extend some distance in rear of the rear ends 5 of the shoe blades 3 and have inwardly bent or curved portions 11 forming rakes for moving the earth inwardly and covering the seed and closing the furrow. Each blade 8 is provided at or about a medial point with a U-shaped bracket 12, one arm of which is riveted or otherwise suitably fixed thereto, as indicated at 13, and the other arm of which has a fastening connection with the portion 5 of the adjacent shoe blade 3, said arm being provided with a series of openings 14 for the passage of a bolt 15, whereby an adjustable connection between the parts mentioned is afforded. The front and rear attaching connections between the covering blades and the shoe obviously adapt the covering blades to be adjusted bodily to different working positions and also adapted to be tilted upwardly or downwardly on the pivotal connection 10, according to the working depth of the shoe 2, so that their seed covering and furrow closing actions may be regulated as desired, that is to say, to cover the deposited seed as lightly or heavily as occasion may require under different conditions of service.

The front portions of the lower edges of the blades 8 are cut away on downwardly and rearwardly curved lines, as at 16, beneath the arms 9 and for a distance in rear thereof, these cut away portions of each blade forming a throat or earth entranceway to the passages between the blades 8 and the adjacent side members or blades 3 of the shoe 2, such throats thus gaging and regulating the amount of earth admitted to cover the seed, which gaging action may be further regulated by vertical body or tilting adjustments of the covering blades so that the exact depth of earth to be laid over the seed, and no more, may be passed for the covering operation, all excess earth being diverted outwardly beyond the lines of travel of the cover blades. Hence the seed may be positively planted at a predetermined depth beneath the surface, and losses incident to irregular depth planting prevented.

It will, of course, be understood that the invention may be employed upon planters of the type disclosed in my aforesaid parent application, or others in common use, and hence the invention is not restricted in this particular. Also, while the construction shown as embodying my invention is preferred, many changes falling within the spirit of the invention and scope of the appended claim may be made without departing from or sacrificing any of the advantages of the invention.

Having thus fully described my invention, I claim:—

In a drill set, a hollow standard of cross-sectional oblong rectangular form and presenting flat sides, a shoe comprising a pair of plates secured to and bearing against said flat sides of the standard, said plates having forward ends extending in advance of the standard and arranged in abutting contact and having rear ends projecting in rear of the standard and disposed in diverging relationship, brackets adjustably secured to said diverging rear ends of the shoe plates, and covering blades arranged on opposite sides of the shoe and having their body portions secured to said brackets and lying outside said diverging ends of the shoe plates and in parallel relationship to each other, the said covering blades having forward end portions arranged above the horizontal centers of their body portions and extending in convergent relationship and bearing against and adjustably secured to the forward ends of the shoe plates, the body portions of said blades terminating below their horizontal centers at the rear of said forward end portions to form passages below the latter and between the same and the forward portions of the shoe plates, and the rear ends of said blades having integral portions turned inwardly toward each other and forming rakes.

In testimony whereof I affix my signature.

LONZO R. HUPP.